March 19, 1935.   E. J. VON PEIN   1,994,549
COUNTING SCALE
Filed Sept. 6, 1933   3 Sheets-Sheet 1
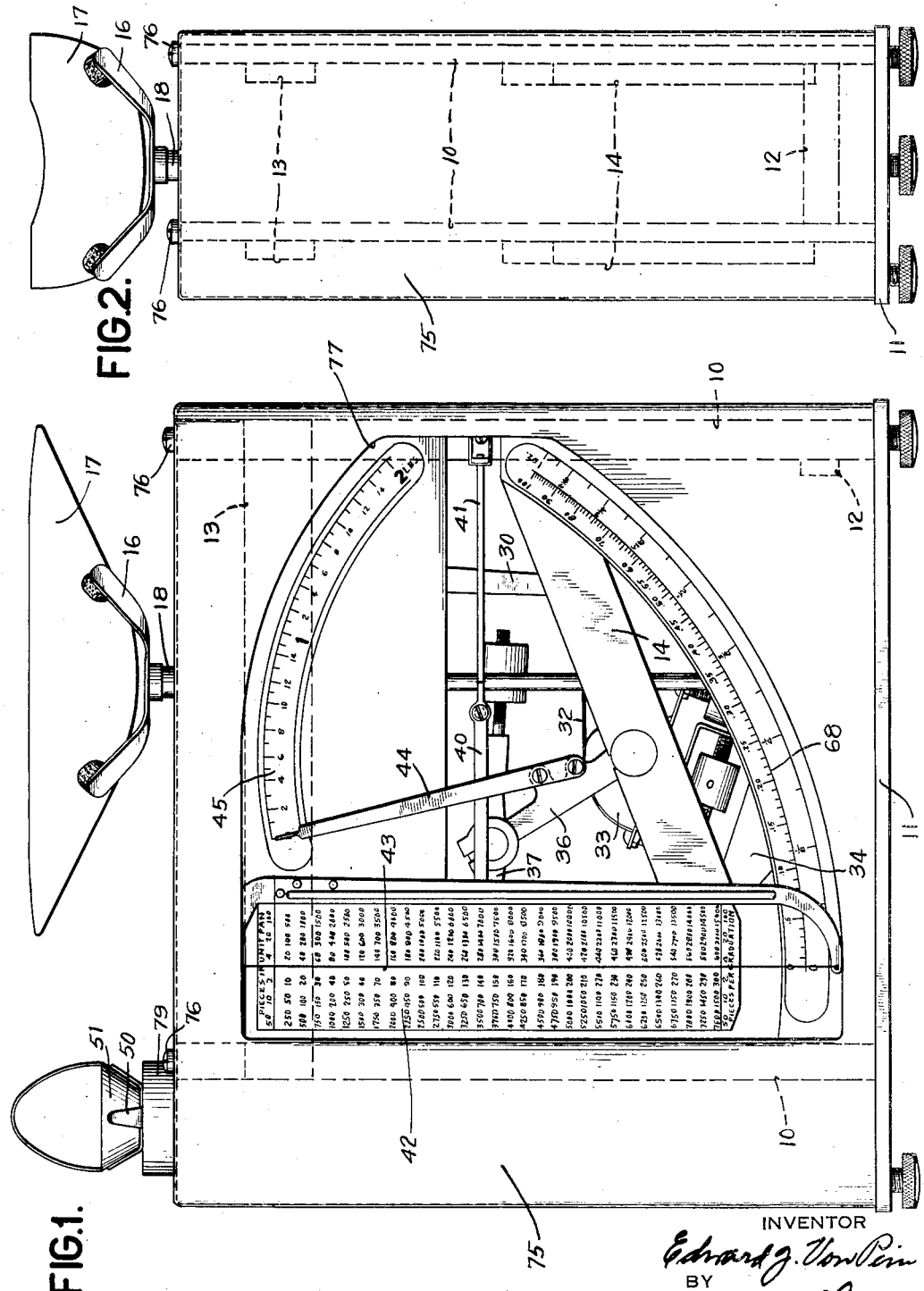

March 19, 1935. E. J. VON PEIN 1,994,549
COUNTING SCALE
Filed Sept. 6, 1933 3 Sheets-Sheet 2

INVENTOR
Edward J. Von Pein
BY
ATTORNEY

March 19, 1935.  E. J. VON PEIN  1,994,549
COUNTING SCALE
Filed Sept. 6, 1933  3 Sheets-Sheet 3

INVENTOR
Edward J. Von Pein
BY
Wm Wilson
ATTORNEY

Patented Mar. 19, 1935

1,994,549

UNITED STATES PATENT OFFICE 1,994,549

COUNTING SCALE

Edward J. Von Pein, Dayton, Ohio, assignor to International Business Machines Corporation, New York, N. Y., a corporation of New York Application September 6, 1933, Serial No. 688,270

3 Claims. (Cl. 265—36)

This case relates to scales of the type disclosed in Patent No. 1,650,224.

In this type of scale, two independently weight-operated weighing mechanisms have coordinated inter-related indicating means which intersect to provide a common result. Such a result may be a count of pieces on the platform of that one of the weighing mechanisms, which is called the main load scale. The other weighing mechanism is called the unit scale. The main scale operates a chart having a line of graduations while the unit scale operates a hair line for intersecting the graduated line of the chart. At the point of intersection, a reading is taken of the count of articles on the main scale.

The object of the present invention is to provide an improved arrangement, housing, and support for the unit and weighing mechanism with both unit and main load platforms located above the indicating means.

Another object is to improve the weighing mechanisms of the unit and main scale to provide for compactness without the sacrifice of sensitivity.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a front view of the scale.

Fig. 2 is an end view of the scale.

Figure 3:
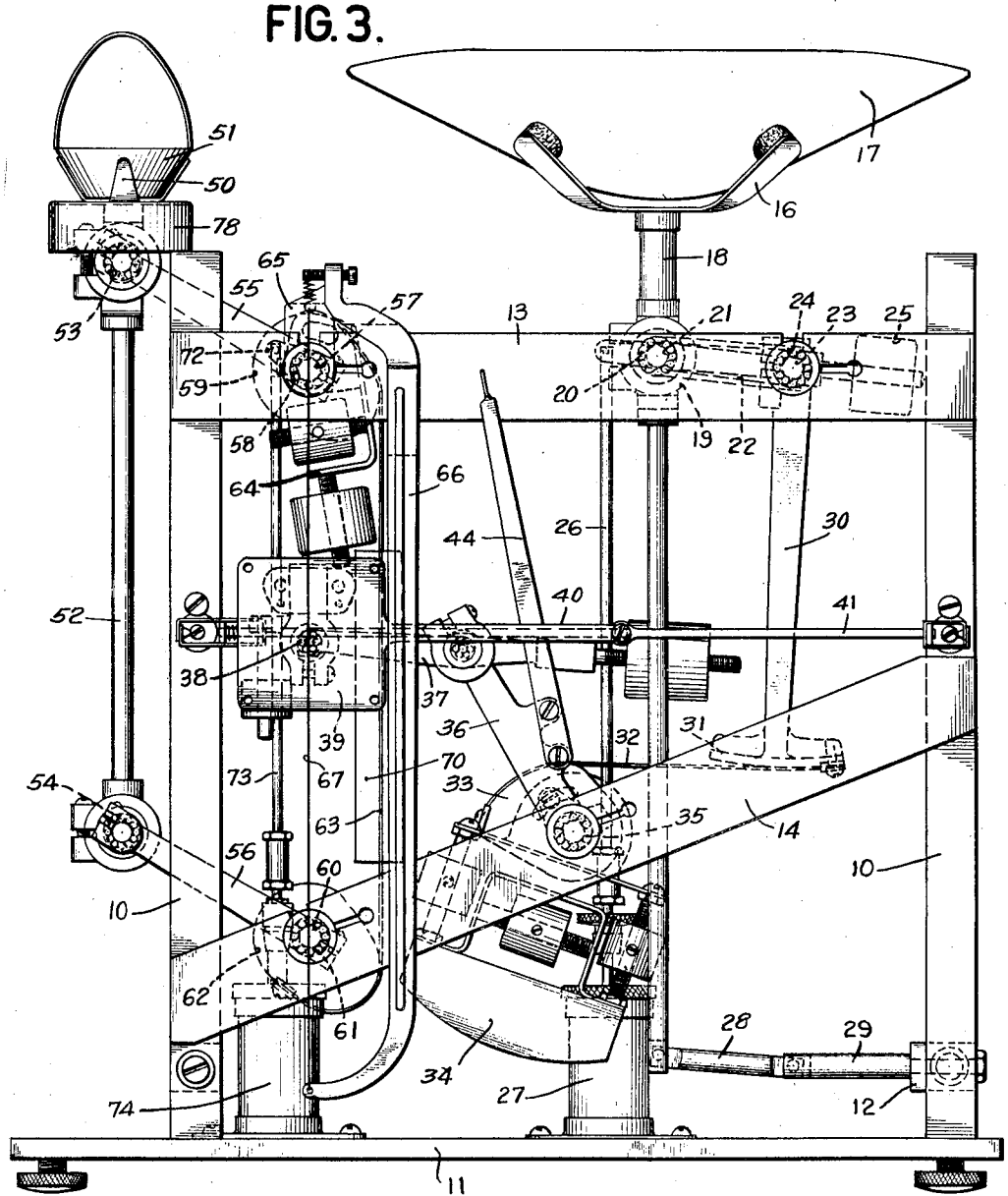
Fig. 3 is a front view with the housing removed.
Figure 4:
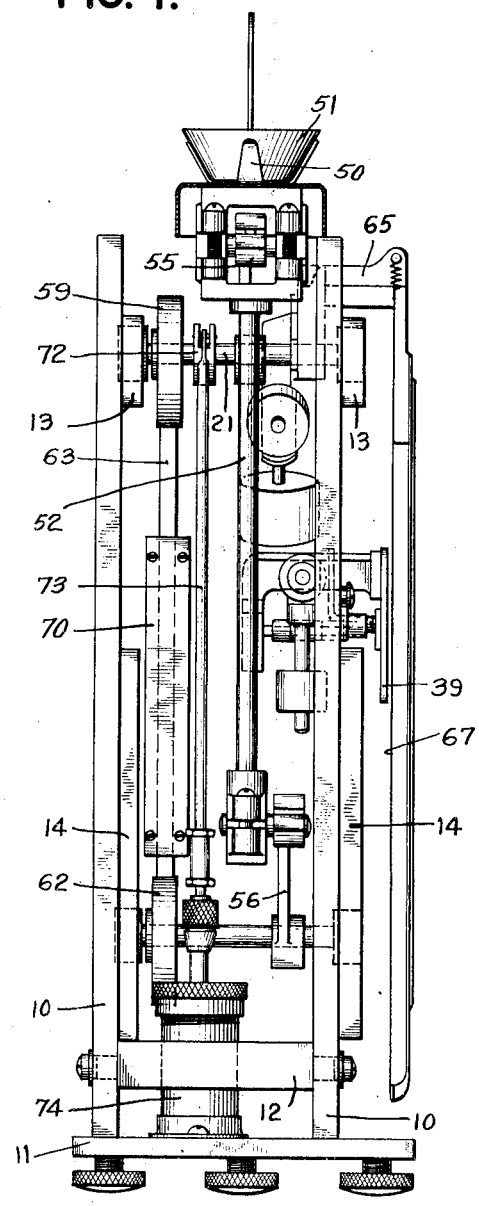
Fig. 4 is a left end view of the scale as shown in Fig. 3.
Figure 5:
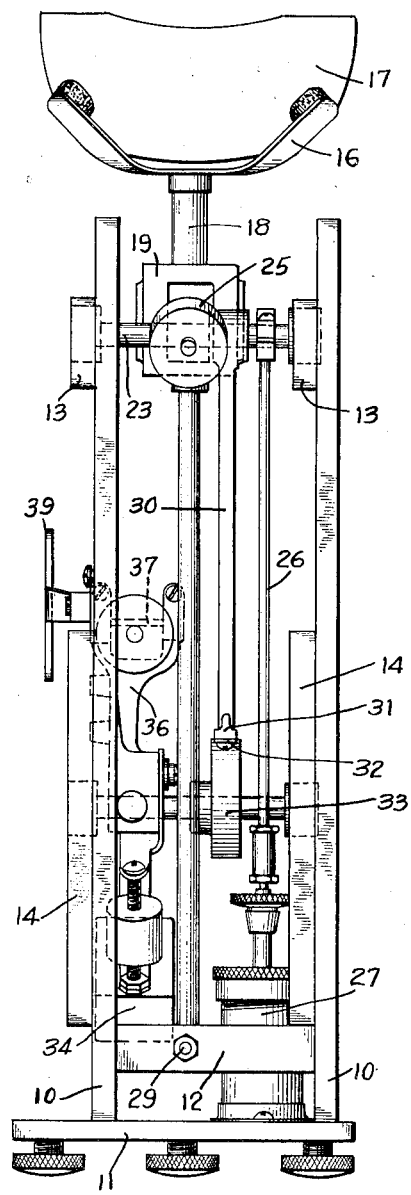
Fig. 5 is a right end view of the scale as shown in Fig. 4.

The scale frame comprises four upright corner posts 10 rising from the base plate 11. Adjacent their lower ends, the end pairs of posts are joined by cross braces 12. The front and rear pairs of posts are connected by cross bars 13 and 14. This construction is such as to provide a rigid frame not depending entirely on the base for rigidity.

The main load scale comprises a spider 16 for the load scoop 17. The spider 16 is mounted on top of a stem 18 which includes a hub 19 containing a ball bearing mounting 20 for the stub shaft 21 provided on the left hand arm of an upper lever 22 having a supporting and fulcruming shaft 23 journaled in a ball bearing 24 carried by the cross bar 13. The right hand arm of lever 22 is threaded to coact with weight 25 for providing a zero adjustment of the main scale. The left hand end of the lever 22 suspends the rod 26 which operates the plunger of the dash pot 27.

At its lower end the stem 18 is pivoted to check lever 28 pivotally supported by a pin 29 secured to the frame brace 12. The left hand arm of lever 22 is of the same length as lever 28 and parallel thereto; therefore, levers 22 and 28 combine with stem 18 to form a check linkage to support the scoop for rectilinear movement under load variations, vertically and parallel to itself.

Depending from the upper lever 22 radially of the fulcrum thereof is an arm 30 having a segmental face 31 at its lower and free end to which is connected one end of a ribbon 32 the other end of which is fastened to the cam-shaped power sector 33 of the pendulum 34 pivoted on ball bearings 35 carried by the cross bars 14. Extending radially from the pendulum assembly is an arm 36 pivoted to the balanced member 37 which through a pivoted connection 38 actuates the bracket 39. The bracket 39 is provided with the extension 40 which has a slidable connection with the guide rod 41 supported at opposite ends by the front pair of posts 10.

Bracket 39 carries the chart 42 having a line 43 of graduations equally spaced for equal counts of articles.

When a number of pieces are placed in scoop 17, the arm 30 moves to the right as viewed in Fig. 3, rocking the pendulum assembly including arm 36 clockwise. Arm 36 moves the chart 42 rectilinearly and horizontally to the right in proportion to the weight of the pieces in pan 17. To indicate the weight of the pieces, a pointer 44 on the pendulum assembly scans a chart 45.

The unit scale comprises a spider 50 for supporting the unit pan 51. The spider is mounted on top of a stem 52 which has upper and lower ball bearing connections 53 and 54 to the respective upper and lower check links 55 and 56. The upper check link 55 has a shaft 57 journaled in ball bearings 58 carried by the upper cross bars 13, and carrying cam 59. The lower check link 56 has a shaft 60 journaled in bearings 61 mounted in the lower cross bars 14. The bars 14 are inclined in order to carry the relatively inclined fulcrums of the main load pendulum assembly and the lower check link 56. Shaft 60 carries cam 62 similar to cam 59, the two cams being interconnected by a ribbon 63. Upper shaft 57 also carries the pendulum assembly 64 and the bracket 65 which supports the indicator hand 66 having a hair line 67. To indicate the weight of the article or articles in unit pan 51, a chart 68 graduated in ounces is provided. This chart has its graduations unevenly spaced, the angles made by the hair line with a horizontal line for any two weights on the unit pan being such that their tans are inversely proportional to the magnitudes of the weights. This gives a movement of the hair line 67 which permits equal increments of count on the graduated line 43 of chart 42 of the main scale to be represented by equal distances along the line 43.

Were the entire counterbalancing action of the unit scale to be provided by the pendulum 64, the hair line 67 would move through angles with a horizontal line whose cosines are inversely proportional to the magnitudes of the weights.

To produce the requirement that the angles of the hair line 67 should be such that their tans are inversely proportional to the magnitudes of the loads, an auxiliary counterbalance weight 70 is provided. This counterbalance consists of a pair of bars clamped to the ribbon 63 connecting the two cams 62, the cams being shaped to vary the resistance of weight 70 to the load in a manner to provide for the required movement of hair line 67.

Upper shaft 57 of the unit scale carries an arm 72 from which is suspended the rod 73 connected to the plunger of the dash pot 74 mounted in the base 11.

The scales are enclosed by a one-piece inverted cup housing 75 which is secured to the upper ends of the posts 10 by screws 76. The housing has a large sight window 77 in one side through which the indications are visible. Stem 52 of the unit scale includes an inverted cup 78 which co-acts with the annular upturned flange 79 on the housing top to form an air seal for the opening in the housing of the stem 52.

In operation, an unknown number of pieces is placed in scoop 17 and one or more pieces are placed in unit pan 51. The load in scoop 17 causes movement of the chart 42 to the right while the load on pan 51 swings the hair line 67 counter-clockwise. Where line 67 intersects the graduated line 43, the count of the pieces in scoop 17 is given by the chart.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A counting scale wherein main and unit weighing mechanisms have intersecting indicators to register the count, characterized by the fact that the unit weighing mechanism comprises a unit pan, a parallellogram linkage for supporting the pan for rising and descending movement parallel to itself in accordance with load variations on the pan, the linkage including parallel upper and lower check levers, a common frame for the both weighing mechanisms, pivots connecting one end of each check lever to the common frame, similar cams carried by the pivots a counterbalancing pendulum carried by one of said pivots, a ribbon connecting the same sides of said cams, and a weight carried by the ribbon for supplementing the counterbalancing action of the pendulum and causing the indicator of the unit weighing mechanism to move equal increments along the indicator of the main scale for equal increments of count.

2. A counting scale wherein main and unit weighing mechanisms have intersecting indicators to register the count, characterized by the fact that the unit weighing mechanism comprises a unit pan, a parallelogram linkage for supporting the pan for rising and descending movement parallel to itself in accordance with load variations on the pan, the linkage including parallel upper and lower check levers, a common frame for the both weighing mechanisms, pivots connecting one end of each check lever to the common frame, similar cams carried by the pivots a counterbalancing pendulum carried by one of said pivots, a ribbon connecting the same sides of cams, and a weight carried by the ribbon for supplementing the counterbalancing action of the pendulum and causing the indicator of the unit weighing mechanism to move through angles whose tans are inversely proportional to the loads on the unit pan.

3. In a counting scale wherein main and unit weighing mechanisms have intersecting indicators to register the count, characterized by the fact that the main scale comprises a load pan, a check linkage below the pan for causing the load pan to move parallel to itself during weighing operations, the check linkage including an upper lever, a frame for pivoting the lever, a pendulum and connected power sector pivoted on said frame, below said lever and a connection between the lever and the power sector including an arm rigidly depending from the lever and having a curved face at its lower extremity, and a ribbon connection between the curved face and the power sector for actuating the pendulum upon movement of the load pan.

EDWARD J. VON PEIN.